(12) United States Patent
Ng et al.

(10) Patent No.: US 8,895,126 B2
(45) Date of Patent: Nov. 25, 2014

(54) SEGMENTED FILMS WITH HIGH STRENGTH SEAMS

(75) Inventors: Wing-Chak Ng, Suwanee, GA (US); Jose Augusto Vidal de Siqueira, Roswell, GA (US)

(73) Assignee: Kimberly-Clark Worldwide, Inc., Neenah, WI (US)

(*) Notice: Subject to any disclaimer, the term of this patent is extended or adjusted under 35 U.S.C. 154(b) by 807 days.

(21) Appl. No.: 12/982,979

(22) Filed: Dec. 31, 2010

(65) Prior Publication Data

US 2012/0172826 A1 Jul. 5, 2012

(51) Int. Cl.
*B32B 3/00* (2006.01)
*B32B 27/30* (2006.01)
*B32B 27/32* (2006.01)
*B29C 47/00* (2006.01)
*B29C 47/92* (2006.01)
*B32B 5/02* (2006.01)
*B29C 47/06* (2006.01)
*B32B 27/12* (2006.01)
*B29C 47/56* (2006.01)
*B32B 3/16* (2006.01)

(52) U.S. Cl.
CPC ............. *B32B 5/022* (2013.01); *B32B 27/302* (2013.01); *B32B 27/32* (2013.01); *B29C 47/0021* (2013.01); *B29C 47/92* (2013.01); *B32B 2437/00* (2013.01); *B32B 2270/00* (2013.01); *B29C 47/065* (2013.01); *B32B 2274/00* (2013.01); *B29C 2947/92647* (2013.01); *B32B 27/12* (2013.01); *B32B 2555/02* (2013.01); *B29C 47/56* (2013.01); *B32B 3/16* (2013.01)

USPC ............. 428/60; 428/156; 428/158; 428/159; 428/172; 428/189; 428/213

(58) Field of Classification Search
USPC ............ 428/60, 156, 158, 159, 172, 189, 213
See application file for complete search history.

(56) References Cited

U.S. PATENT DOCUMENTS

| 1,603,813 | A | | 10/1926 | Jacob |
|---|---|---|---|---|
| 3,321,804 | A | | 5/1967 | Breidt, Jr. et al. |
| 3,405,425 | A | | 10/1968 | Buckley et al. |
| 3,449,186 | A | * | 6/1969 | Sture .............................. 156/159 |
| 3,485,912 | A | | 12/1969 | Schrenk et al. |
| 3,555,128 | A | | 1/1971 | Schrenk |
| 3,565,985 | A | | 2/1971 | Schrenk et al. |

(Continued)

FOREIGN PATENT DOCUMENTS

DE 198 06 452 A1 8/1999
EP 0 018 020 A1 10/1980

(Continued)

*Primary Examiner* — Elizabeth Cole
(74) *Attorney, Agent, or Firm* — Patrick C. Wilson

(57) ABSTRACT

Unitary films and laminates thereof are provided having at least first and second film segments which extend adjacent one another and are permanently joined together. The first and second film segments are joined at an interface, wherein at the interface a tip of the second segment overlaps the first segment in the cross-direction of the film. The film has a thickness "T" at the tip of the second segment, and the second segment has a thickness "t" at a distance T in the cross direction from the tip of the second segment. The ratio T/t is suitably greater than about 3. The unitary films and laminates thereof are well suited, for example, for use as outer covers in personal care articles.

15 Claims, 2 Drawing Sheets

(56) References Cited

U.S. PATENT DOCUMENTS

| | | |
|---|---|---|
| 3,687,589 A | 8/1972 | Schrenk |
| 3,738,790 A | 6/1973 | Violette et al. |
| 3,756,758 A | 9/1973 | Prall |
| 3,764,450 A | 10/1973 | Tesch |
| 3,800,796 A | 4/1974 | Jacob |
| 3,807,918 A | 4/1974 | Chill et al. |
| 3,989,867 A | 11/1976 | Sisson |
| 4,050,972 A | 9/1977 | Cardinal, Jr. |
| 4,283,168 A | 8/1981 | Miller et al. |
| 4,435,141 A | 3/1984 | Weisner et al. |
| 4,521,359 A | 6/1985 | Tsien |
| 4,533,510 A | 8/1985 | Nissel |
| 4,662,875 A | 5/1987 | Hirotsu et al. |
| 4,731,004 A | 3/1988 | Wenz, Jr. |
| 4,777,073 A | 10/1988 | Sheth |
| 4,781,962 A | 11/1988 | Zamarripa et al. |
| 4,883,480 A | 11/1989 | Huffman et al. |
| 5,045,264 A | 9/1991 | Kirksey |
| 5,057,097 A | 10/1991 | Gesp |
| 5,120,484 A | 6/1992 | Cloeren |
| 5,223,276 A | 6/1993 | Djordjevic et al. |
| 5,501,679 A | 3/1996 | Krueger et al. |
| 5,567,376 A | 10/1996 | Turi et al. |
| 5,620,780 A | 4/1997 | Krueger et al. |
| 5,635,276 A | 6/1997 | Biagioli et al. |
| 5,766,389 A | 6/1998 | Brandon et al. |
| 5,800,903 A | 9/1998 | Wood et al. |
| 5,807,368 A | 9/1998 | Helmer |
| 5,843,554 A | 12/1998 | Katz |
| 5,855,999 A | 1/1999 | McCormack |
| 5,885,908 A | 3/1999 | Jaeger et al. |
| 5,968,029 A | 10/1999 | Chappell et al. |
| 5,993,432 A | 11/1999 | Lodge et al. |
| 6,045,543 A | 4/2000 | Pozniak et al. |
| 6,100,208 A | 8/2000 | Brown et al. |
| 6,159,584 A | 12/2000 | Eaton et al. |
| 6,221,483 B1 | 4/2001 | Hilston et al. |
| 6,245,401 B1 | 6/2001 | Ying et al. |
| 6,255,236 B1 | 7/2001 | Cree et al. |
| 6,277,479 B1 | 8/2001 | Campbell et al. |
| 6,403,505 B1 | 6/2002 | Groitzsch et al. |
| 6,409,494 B1 | 6/2002 | Voss |
| 6,432,074 B1 | 8/2002 | Ager et al. |
| 6,472,084 B1 | 10/2002 | Middlesworth et al. |
| 6,531,207 B1 | 3/2003 | Eaton et al. |
| 6,572,575 B1 | 6/2003 | Shimada et al. |
| 6,626,206 B1 | 9/2003 | Ulcei et al. |
| 6,627,791 B1 | 9/2003 | Veglio et al. |
| 6,669,887 B2 | 12/2003 | Hilston et al. |
| 6,692,477 B2 | 2/2004 | Gibbs |
| 6,729,867 B2 | 5/2004 | Peter et al. |
| 6,740,071 B2 | 5/2004 | Gibbs |
| 6,780,272 B2 | 8/2004 | Wood |
| 6,916,969 B1 | 7/2005 | Helmfridsson et al. |
| 6,927,315 B1 | 8/2005 | Heinecke et al. |
| 6,942,651 B2 | 9/2005 | Gibbs |
| 6,949,283 B2 | 9/2005 | Kollaja et al. |
| 7,014,631 B2 | 3/2006 | Jackson et al. |
| 7,037,300 B2 | 5/2006 | Kling |
| 7,039,990 B2 | 5/2006 | Gorman et al. |
| 7,048,013 B2 | 5/2006 | Shannon |
| 7,102,054 B1 | 9/2006 | Cree et al. |
| 7,316,675 B2 | 1/2008 | Soga et al. |
| 7,347,845 B2 | 3/2008 | Zajaczkowski |
| 7,462,172 B2 | 12/2008 | Wright et al. |
| 7,534,481 B2 | 5/2009 | Seth et al. |
| 7,569,040 B2 | 8/2009 | Nakahata et al. |
| 7,589,249 B2 | 9/2009 | Gubernick et al. |
| 7,674,949 B2 | 3/2010 | Wahlstrom et al. |
| 7,704,589 B2 | 4/2010 | Olson et al. |
| 7,744,579 B2 | 6/2010 | Langdon et al. |
| 7,799,162 B2 | 9/2010 | Wood et al. |
| 7,870,651 B2 | 1/2011 | Middlesworth et al. |
| 7,897,081 B2 | 3/2011 | Ausen et al. |
| 7,943,537 B2 | 5/2011 | Vincent et al. |
| 8,016,807 B2 | 9/2011 | Kline et al. |
| 8,067,063 B2 | 11/2011 | Desai et al. |
| 8,088,116 B2 | 1/2012 | Kline et al. |
| 8,182,456 B2 | 5/2012 | Autran et al. |
| 8,188,333 B2 | 5/2012 | Matsuoka et al. |
| 8,198,200 B2 | 6/2012 | Autran et al. |
| 8,211,078 B2 | 7/2012 | Noel |
| 8,227,660 B2 | 7/2012 | Hara et al. |
| 8,357,135 B2 | 1/2013 | De Dier et al. |
| 8,460,588 B2 | 6/2013 | Lake et al. |
| 2001/0037851 A1 | 11/2001 | Mortellite et al. |
| 2003/0125687 A1 | 7/2003 | Gubernick et al. |
| 2003/0136497 A1 | 7/2003 | Hamulski et al. |
| 2003/0173015 A1 | 9/2003 | Hamulski et al. |
| 2003/0194936 A1 | 10/2003 | Jackson et al. |
| 2004/0013850 A1 | 1/2004 | Kling |
| 2004/0044324 A1 | 3/2004 | Swenson et al. |
| 2004/0122396 A1 | 6/2004 | Maldonado et al. |
| 2005/0095943 A1 | 5/2005 | Griffin et al. |
| 2005/0148971 A1 | 7/2005 | Kuroda et al. |
| 2005/0215972 A1 | 9/2005 | Roe et al. |
| 2006/0047259 A1 | 3/2006 | Erdman et al. |
| 2006/0068168 A1 | 3/2006 | Olson et al. |
| 2006/0083907 A1* | 4/2006 | Bech et al. .................... 428/212 |
| 2006/0137079 A1 | 6/2006 | Goodrich et al. |
| 2006/0147686 A1 | 7/2006 | Ausen et al. |
| 2006/0246802 A1 | 11/2006 | Hughes et al. |
| 2006/0288547 A1 | 12/2006 | Jackson |
| 2007/0130732 A1 | 6/2007 | Matsumura et al. |
| 2007/0141352 A1 | 6/2007 | Calhoun et al. |
| 2007/0142798 A1 | 6/2007 | Goodlander et al. |
| 2007/0250023 A1 | 10/2007 | Strannemalm |
| 2008/0070007 A1 | 3/2008 | Vincent et al. |
| 2008/0095978 A1 | 4/2008 | Siqueira et al. |
| 2008/0099951 A1 | 5/2008 | Batch et al. |
| 2008/0108267 A1 | 5/2008 | Baldauf et al. |
| 2008/0113153 A1 | 5/2008 | Tiozzo |
| 2008/0138598 A1 | 6/2008 | Michel et al. |
| 2008/0233418 A1 | 9/2008 | Krueger |
| 2009/0247980 A1 | 10/2009 | Aiken |
| 2009/0312736 A1 | 12/2009 | Schroer, Jr. et al. |
| 2010/0324517 A1 | 12/2010 | Lenhult et al. |
| 2011/0160691 A1 | 6/2011 | Ng et al. |
| 2011/0206943 A1* | 8/2011 | Willis et al. .................... 428/609 |

FOREIGN PATENT DOCUMENTS

| | | |
|---|---|---|
| EP | 0 707 938 A2 | 4/1996 |
| EP | 0 756 855 A1 | 2/1997 |
| EP | 0 792 733 A1 | 9/1997 |
| EP | 1 078 620 A2 | 2/2001 |
| EP | 0 834 387 B1 | 7/2003 |
| EP | 1 591 091 A2 | 11/2005 |
| GB | 1 311 085 A | 3/1973 |
| GB | 2 267 024 A | 11/1993 |
| JP | 09-174646 A | 7/1997 |
| JP | 2001-328180 A | 11/2001 |
| JP | 2006-159537 A | 6/2006 |
| KR | 0137121 Y1 | 3/1999 |
| KR | 10-2005-0090403 A | 9/2005 |
| KR | 10-2006-0094537 A | 8/2006 |
| WO | WO 92/01759 A1 | 2/1992 |
| WO | WO 01/21126 A1 | 3/2001 |
| WO | WO 01/32403 A1 | 5/2001 |
| WO | WO 03/034966 A1 | 5/2003 |
| WO | WO 2005/037159 A1 | 4/2005 |
| WO | WO 2005/053588 A1 | 6/2005 |
| WO | WO 2006/065175 A1 | 6/2006 |
| WO | WO 2008/099438 A2 | 8/2008 |
| WO | WO 2009/005413 A1 | 1/2009 |
| WO | WO 2009/157835 A1 | 12/2009 |
| WO | WO 2011/104014 A1 | 9/2011 |

* cited by examiner

SEGMENTED FILMS WITH HIGH STRENGTH SEAMS

BACKGROUND OF THE INVENTION

Thin films have a wide variety of applications including use as outer covers for personal care products (e.g. diapers or incontinence garments), medical garments, industrial workwear and so forth. In addition, laminates of such films have found use in various bodily articles as well as numerous other applications. The films can provide the desired barrier properties to the article while other materials laminated thereto can provide additional desired characteristics such as strength, abrasion resistance and/or good hand.

Segmented films can be used to provide different properties to different areas of a product. For example, it may not be necessary to have high breathability and good stretch and recovery properties in the same area of the film. In that case, a segmented film having elastic segments on the outer edges and a breathable barrier segment in the center can be used as an outercover film for a personal care absorbent product.

However, segmented films may be weak at the interface between the segments. The weak interface can be prone to tearing. The weakness can be due to lack of cohesiveness between the different materials used in the different segments of the film.

Thus, there exists a need for an improved segmented film having improved strength at an interface between the segments of the film.

SUMMARY OF THE INVENTION

The aforesaid needs are fulfilled and the problems experienced by those skilled in the art overcome by the segmented film of the present invention which includes a first film segment having a first composition and a second film segment having a second composition, the first and second film segments being joined at an interface extending in the machine direction of the segmented film. At the interface a tip of the second segment overlaps the first segment in the cross-direction of the film. The film has a thickness "T" at the tip of the second segment, and the second segment has a thickness "t" at a distance T in the cross direction from the tip of the second segment. The ratio T/t is suitably greater than about 3. Desirably, the segmented film has a substantially uniform thickness and the first and second segments extend adjacent one another continuously in the machine-direction of the film.

In another aspect, the first or second film segment may include a microporous film. In one embodiment, the composition of the first or second film segment includes thermoplastic polymer and filler. The thermoplastic polymer may be an inelastic polyolefin polymer. Desirably, the filler is distributed throughout the first film segment. More desirably, the first or second film segment has micropores adjacent the filler.

In a further aspect, the first or second film segment may include an elastic polymer selected from the group consisting of polyolefin elastomers, styrenic block copolymers, polyurethanes, polyesters, polyamides, vinyl acetates, acrylates and blends thereof.

In a further aspect, the segmented films of the present invention can be laminated or fixedly attached to a sheet such as, for example, a nonwoven web, woven fabric, and so forth. As used herein, the term "sheet" refers to a layer of material which can be a woven material, knitted material, scrim, nonwoven web or other like material. In addition, the films and film laminates of the present invention are well suited for use in personal care articles, protective apparel, protective covers and infection control products. As an example, personal care articles of the present invention can include (i) a liquid pervious topsheet; (ii) an outer cover comprising a segmented film or film laminate as described herein; and (iii) an absorbent core positioned between the outer cover and topsheet. The first and second film segments can be selectively positioned within the article to provide the desired attributes such as body conformance, regional water vapor transmission rates and/or aesthetics.

In another embodiment, a method of forming a segmented film includes the steps of providing first and second polymer compositions to a segmented feedblock; transferring the first and second polymer compositions to a film die; and co-extruding from the film die a segmented film comprising a first film segment of the first polymer composition and a second film segment of the second polymer composition, the first and second film segments being joined at an interface, wherein at the interface a tip of the second film segment overlaps the first film segment in the cross-direction of the film, and wherein the film has a thickness "T" at the tip of the second film segment, and the second film segment has a thickness "t" at a distance T in the cross direction from the tip of the second film segment, and wherein the ratio T/t is greater than about 3.

In a further embodiment, a method of forming a segmented film includes the steps of providing first and second polymer compositions to a segmented feedblock that feeds the first and second polymer compositions to a film die; and co-extruding from the film die a segmented film comprising a first film segment of the first polymer composition and a second film segment of the second polymer composition, wherein the first and second polymer compositions flow together in the film die substantially in a cross direction prior to exiting the film die in a machine direction, and further wherein the first and second film segments extend adjacent one another continuously in the machine-direction.

Other features and aspects of the present invention are described in more detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Figure 1A:
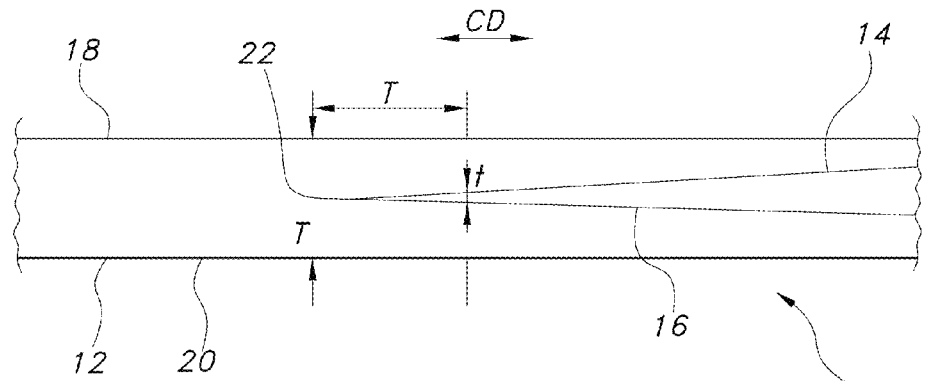
FIG. 1A is a cross-sectional view of the multi-segmented film of FIG. 1 taken at 1A-1A.

Repeat use of reference characters in the present specification and drawings is intended to represent same or analogous features or elements of the invention.

DETAILED DESCRIPTION OF REPRESENTATIVE EMBODIMENTS

Reference now will be made in detail to various embodiments of the invention, one or more examples of which are set forth below. Each example is provided by way of explanation, not limitation of the invention. In fact, it will be apparent to those skilled in the art that various modifications and variations may be made in the present invention without departing from the scope or spirit of the invention. For instance, features illustrated or described as part of one embodiment, may be used on another embodiment to yield a still further embodiment. Thus, it is intended that the present invention cover such modifications and variations.

Figure 1:
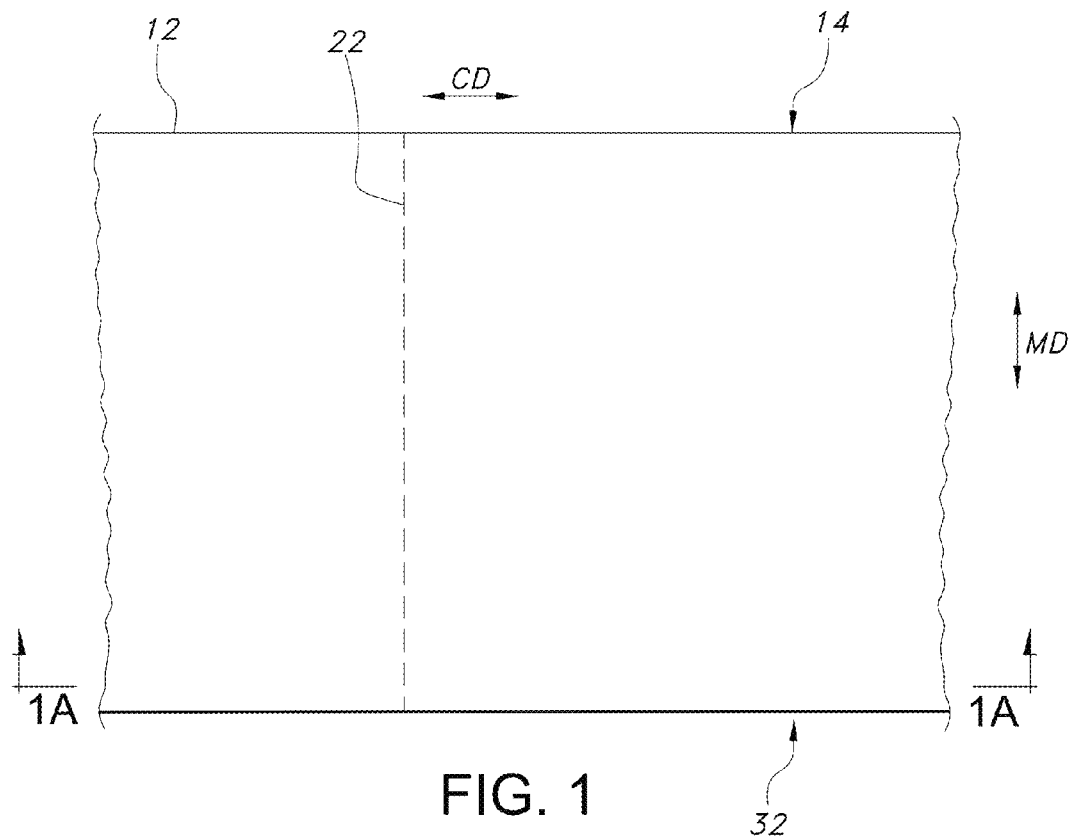
FIG. 1 is a top, plan view of a multi-segmented film of the present invention.

In reference to FIGS. 1 and 1A, a unitary segmented film 32 having a machine direction (MD) and a cross direction (CD), further having a first surface 18 and a second surface 20 parallel or generally parallel to the first surface, is shown having at least a first segment 12 attached to at least a second segment 14 with an interface or seam 16 where the first segment is attached to the second segment. The first segment 12, second segment 14, and the seam 16 generally run continuously in the machine direction. At the interface 16 the second segment 14 overlaps the first segment 12 in the cross direction, that is, the first segment extends past the second segment in the cross direction. The second segment 14 extends past or overlaps the first segment 12 to a tip 22 of the second segment. The tip 22 of the second segment 14 is the part of the second segment that extends the farthest in the cross direction into the first segment 12.

The extent to which the second segment overlaps the first segment may be assessed by comparing the thickness "T" of the film 32 at the tip 22 of the second segment 14 to the thickness "t" of the second segment at a distance "T" in the cross-direction from the tip. Desirably, the ratio T/t is large, indicating a greater overlap of the first segment 12 and second segment 14 at the interface 16. In some embodiments, the ratio T/t is suitably greater than about 3, more suitably greater than about 5, and even more suitably greater than about 7. In other embodiments, the ratio T/t is suitably in a range from about 3 to about 50, more suitably in a range from about 5 to about 50, even more suitably in a range from about 7 to about 50. In another embodiment, the ratio T/t is suitably in a range from about 3 to about 30, more suitably in a range from about 6 to about 30, and even more suitably in a range from about 10 to about 30.

Desirably, the first segment 12 comprises at least about 10% of the area of the segmented film 32 and, even more desirably, comprises between about 20% and about 80% of the area of the segmented film 32. Although thicker segmented films are possible, the unitary segmented film desirably has a maximum film thickness less than about 50 microns and still more desirably has a maximum film thickness between about 10 microns and about 35 microns. The first and second segments 12 and 14 can be selected to comprise distinct films having varied attributes such as, for example, distinct breathability and/or elastic properties. As used herein, the term "elastic" generally refers to material which, upon application of a biasing force, is extensible or elongatable in at least one direction and returns substantially to its original dimensions immediately after the biasing force is removed.

Segmented films, as described herein, may have distinct film segments which exhibit varied levels of breathability and/or elasticity can be formed by various methods. Segmented films can be formed by coextruding the respective adjacent segments such as, for example, using the method and apparatus for forming films as disclosed in U.S. Pat. No. 4,533,510 to Nissel et al., the entire contents of which are incorporated herein by reference. Film dies for forming side-by-side coextruded films are commercially available from Extrusion Dies Industries, LLC of Chippewa Falls, Wis. and Cloeren Inc. of Orange, Tx. The desired components of the respective film segments can be separately mixed, heated and then coextruded into the respective side-by-side segments of a unitary segmented film. The film may be made by any one of a variety of film forming processes known in the art such as, for example, by using either cast or blown film equipment. Desirably, the first and second compositions are introduced to a segmented feed block prior to entering the film die. The segmented feed block allows contact between the first and second compositions prior to the compositions entering the film die. This early contact between the first and second compositions is believed to result in the extended overlap of the first and second segments at the interface between the segments. In one embodiment, a feed block suitable for making layered films from one or more polymer compositions is rotated 90 degrees with respect to the die body to provide segmented films rather than layered films. Suitable feed blocks, such as micro feed blocks or modular feed blocks, may be obtained from Randcastle Extrusion Systems, Inc., of Cedar Grove, N.J. The extruded segmented film is then processed as desired.

In one aspect, the unitary segmented film can be stretched in at least one direction, thereby reducing the film gauge or thickness. As discussed in more detail herein below, a particularly desirable film or film segment is a microporous stretched filled-film. Such microporous filled-film segments may include at least a thermoplastic polymer and filler. With regard to microporous stretched filled-films, in addition to reducing the film thickness, stretching may also impart porosity to the film and may form a micropore network therein which renders the films breathable. As used herein the term "polymer" generally includes but is not limited to, homopolymers, copolymers, such as for example, block, graft, random and alternating copolymers, terpolymers, etc. and blends and modifications thereof. Furthermore, unless otherwise specifically limited, the term "polymer" includes all possible spatial configurations of the molecule. These configurations include, but are not limited to isotactic, syndiotactic and random symmetries. As used herein the term "blend" means a mixture of two or more polymers while the term "alloy" means a subclass of blends wherein the components are immiscible but have been compatibilized. As used herein "filler" is meant to include particulates and other forms of materials which can be added to the polymer and which will not chemically interfere with or adversely affect the extruded film but is able to be dispersed throughout the film. The filler particles may optionally be coated with a fatty acid, such as stearic acid or behenic acid, and/or other material in order to facilitate the free flow of the particles (in bulk) and their ease of dispersion into the polymer. Stretching can be achieved by various means known to those skilled in the art. Films can be stretched or oriented in either or both the MD and CD. As used herein, the term "machine direction" or MD means the direction in which a film or fabric is produced. The term "cross machine direction" or CD means the direction associated with the width of film or fabric, i.e. a direction generally perpendicular to the MD. As examples, machine direction orientation equipment is commercially available from vendors such as the Marshall and Williams Company of Providence, R.I. and biaxial orientation equipment is commercially available from Bruckner GMBH of Siegsdorf, Germany. As a further example, the films can be stretched utilizing grooved or patterned rollers such as, for example, those described in U.S. Pat. No. 4,153,751 to Schwarz, U.S. Pat. No. 5,028,289 to Rasmussen, and U.S. Pat. No. 6,368,444 to Jameson et al.; the entire contents of the aforesaid references are incorporated herein by reference. When using one or more elastic segments it may be advantageous to anneal or heat set the stretched segmented film while in the stretched or tensioned state in order to set the elastic segment and reduce the potential for puckering of the film caused by the retractive force of the elastic segments. In addition, when using films which have been independently pre-formed and subsequently joined, it is possible to process the films, for example to stretch-thin the films and so forth, either prior to or after permanently joining the respective segments together to form a unitary segmented film.

There exists a wide variety of polymers suitable for use with the present invention. The segments of the segmented film can be made from any thermoplastic polymer suitable for film formation and desirably comprise thermoplastic polymers which can be readily stretched to reduce the film gauge or thickness. Film forming polymers suitable for use with the present invention, alone or in combination with other polymers, include, by way of example only, polyolefins, ethylene vinyl acetate (EVA), ethylene ethyl acrylate (EEA), ethylene acrylic acid (EAA), ethylene methyl acrylate (EMA), ethylene normal butyl acrylate (EnBA), polyester, polyethylene terephthalate (PET), nylon, ethylene vinyl alcohol (EVOH), polystyrene (PS), polyurethane (PU), polybutylene (PB), polyether esters, polyether amides, and polybutylene terephthalate (PBT).

Suitable polymers for forming one or more of the film segments, include, but are not limited to, polyolefins. A wide variety of polyolefin polymers exist and the particular composition of the polyolefin polymer and/or method of making the same is not believed critical to the present invention and thus both conventional and non-conventional polyolefins capable of forming films are believed suitable for use in the present invention. As used herein, "conventional" polyolefins refers to those made by traditional catalysts such as, for example, Ziegler-Natta catalysts. Suitable polyethylene and polypropylene polymers are widely available and, as one example, linear low density polyethylene is available from The Dow Chemical Company of Midland, Mich. under the trade name AFFINITY and conventional polypropylene is available from ExxonMobil Chemical Company of Houston, Tex. In addition, elastic and inelastic polyolefins made by "metallocene", "constrained geometry" or "single-site" catalysts are also suitable for use in the present invention. Examples of such catalysts and polymers are described in U.S. Pat. No. 5,472,775 to Obijeski et al.; U.S. Pat. No. 5,451,450 to Erderly et al.; U.S. Pat. No. 5,278,272 to Lai et al.; U.S. Pat. No. 5,272,236 to Lai et al.; U.S. Pat. No. 5,204,429 to Kaminsky et al.; U.S. Pat. No. 5,539,124 to Etherton et al.; and U.S. Pat. No. 5,554,775 to Krishnamurti et al.; the entire contents of which are incorporated herein by reference. The aforesaid patents to Obijeski and Lai teach exemplary polyolefin elastomers and, in addition, exemplary low density polyethylene elastomers are commercially available from The Dow Chemical Company under the trade name AFFINITY, from ExxonMobil Chemical Company, under the trade name EXACT, and from Dupont Dow Elastomers, L.L.C. under the trade name ENGAGE. Moreover, exemplary propylene-ethylene copolymer plastomers and elastomers are commercially available from The Dow Chemical Company under the trade name VERSIFY and ExxonMobil Chemical Company under the trade name VISTAMAXX.

In addition, stereoblock polymers are also believed well suited for practicing the present invention. The term "stereoblock polymer" refers to polymeric materials with controlled regional tacticity or stereosequencing to achieve desired polymer crystallinity. By controlling the stereoregularity during polymerization, it is possible to achieve atacticisotactic stereo blocks. Methods of forming polyolefin stereoblock polymers are known in the art and are described in the following articles: G. Coates and R. Waymouth, "Oscillating Stereocontrol: A Strategy for the Synthesis of Thermoplastic Elastomeric Polypropylene" 267 Science 217-219 (January 1995); K. Wagener, "Oscillating Catalysts: A New Twist for Plastics" 267 Science 191 (January 1995). Stereoblock polymers and methods of their production are also described in U.S. Pat. No. 5,594,080 to Waymouth et al., U.S. Pat. No. 5,208,304 to Waymouth and European Patent Application Publication No. 0475306 A1. As indicated above, by controlling the crystallinity of olefins it is possible to provide polymers exhibiting unique tensile modulus and/or elongation properties. In addition, polyolefin copolymers, and in particular propylene-ethylene copolymers, are also suitable for use with the present invention. As but one example, exemplary propylene-ethylene copolymers can comprise multistep reactor products wherein an amorphous ethylene propylene random copolymer is molecularly dispersed in a predominately semi-crystalline high propylene monomer/low ethylene monomer continuous matrix. Examples of such polymers are described in U.S. Pat. No. 5,300,365 to Ogale; U.S. Pat. No. 5,212,246 to Ogale and U.S. Pat. No. 5,331,047 to Giacobbe. Such polymers are commercially available from LyondellBasell under the trade name CATALLOY polymers.

Other exemplary commercially available elastomeric materials include, but are not limited to, the following polymers: elastomeric polyurethanes such as, for example, those available under the trade name ESTANE from Lubrizol Advanced Materials, Inc.; elastomeric polyether esters such as, for example, those available under the trade name HYTREL from E. I. DuPont De Nemours & Company, and those available under the trade name ARNITEL available from DSM of Sittard, Holland (formerly available from Akzo Plastics of Arnhem, Holland); and elastomeric polyether amides commercially available from Arkema, Inc. under the trade name PEBAX. As additional examples, suitable thermoplastic elastomers also include those made from block copolymers having the general formula A-B-A' where A and A' are each a thermoplastic polymer endblock which contains a styrenic moiety such as a poly(vinyl arene) and where B is an elastomeric polymer midblock such as a conjugated diene or a lower alkene polymer. Further, exemplary block copolymers include A-B-A-B tetrablock polymers having an isoprene monomer unit hydrogenated to a substantially poly (ethylene-propylene) monomer unit such as a styrene-poly (ethylene-propylene)-styrene-poly(ethylene-propylene) elastomeric block copolymer. Examples of such styrene-olefin block copolymers include styrene-(ethylene-butylene), styrene-(ethylene-propylene), styrene-(ethylene-butylene)-styrene, styrene-(ethylene-propylene)-styrene, styrene-(ethylene-butylene)-styrene-(ethylene-butylene), styrene-(ethylene-propylene)-styrene-(ethylene-propylene), and styrene-ethylene-(ethylene-propylene)-styrene. These block copolymers may have a linear, radial or star-shaped molecular configuration. As specific examples, exemplary elastomers can comprise (polystyrene/poly(ethylene-butylene)/polystyrene) block copolymers available from the Kraton Polymers LLC under the trade name KRATON as well as polyolefin/KRATON blends such as those described in U.S. Pat. Nos. 4,663,220, 4,323,534, 4,834,738, 5,093,422, 5,304,599, and 5,332,613, the entire contents of the aforesaid references are incorporated herein by reference. Still other suitable copolymers include the S-I-S and S-B-S elastomeric copolymers available from Dexco Polymers of Houston, Tex. under the trade designation VECTOR®.

Other additives may also be incorporated into the film, such as melt stabilizers, crosslinking catalysts, pro-rad additives, processing stabilizers, heat stabilizers, light stabilizers, antioxidants, heat aging stabilizers, whitening agents, antiblocking agents, bonding agents, tackifiers, viscosity modifiers, etc. Examples of suitable tackifier resins may include, for instance, hydrogenated hydrocarbon resins. REGALREZ™ hydrocarbon resins are examples of such hydrogenated hydrocarbon resins, and are available from Eastman Chemical. Other tackifiers are available from ExxonMobil under the ESCOREZ™ designation. Viscosity modifiers may also be employed, such as polyethylene wax (e.g., EPOLENE™ C-10 from Eastman Chemical). Phosphite stabilizers (e.g., IRGAFOS available from Ciba Specialty Chemicals of Terrytown, N.Y. and DOVERPHOS available from Dover Chemical Corp. of Dover, Ohio) are exemplary melt stabilizers. In addition, hindered amine stabilizers (e.g., CHIMASSORB available from Ciba Specialty Chemicals) are exemplary heat and light stabilizers. Further, hindered phenols are commonly used as an antioxidant in the production of films. Some suitable hindered phenols include those available from Ciba Specialty Chemicals of under the trade name "Irganox®", such as Irganox® 1076, 1010, or E 201. Moreover, bonding agents may also be added to the film to facilitate bonding of the film to additional materials (e.g., nonwoven web). Typically, such additives (e.g., tackifier, antioxidant, stabilizer, etc.) are each present in an amount from about 0.001 wt. % to about 25 wt. %, in some embodiments, from about 0.005 wt. % to about 20 wt. %, and in some embodiments, from 0.01 wt. % to about 15 wt. % of the film.

As indicated above, the first segment of the segmented film may include a breathable film. As used herein, the term "breathable" or "breathability" refers to the water vapor transmission rate (WVTR) of an area of fabric which is measured in grams of water per square meter per day ($g/m^2/24$ hours). WVTR results are reported in grams/square meter/day. Further, as used herein the term "breathable" refers to a fabric having a WVTR of at least 800 $g/m^2/24$ hours. Various breathable films are suitable for use with the present invention, including both microporous and monolithic (i.e. non-porous) films. Breathable films comprising the first segment or segments can be elastic or inelastic and desirably have a WVTR of at least about 800 $g/m^2/day$, and more desirably having a WVTR in excess of about 1500 $g/m^2/day$, and still more desirably a WVTR in excess of about 3500 $g/m^2/day$, and even more desirably a WVTR of about 5000 $g/m^2/day$ or more. In one aspect, the first segments can be inelastic or less-elastic than the second segment and may exhibit higher breathability levels relative to the second segments before aperturing. Monolithic or non-microporous breathable films can exhibit good breathability when they comprise polymers which inherently have good water vapor transmission rates (i.e., polymers which allow water vapor to readily diffuse through the film) such as, for example, polyurethanes, polyether esters, polyether amides, EMA, EEA, EVA and the like. Examples of breathable microporous films suitable for use as one or more segments of the segmented film include, but are not limited to, those described in the following references: U.S. Pat. No. 5,695,868 to McCormack; U.S. Pat. No. 6,075,179 to McCormack et al.; U.S. patent application Ser. No. 08/722,726 filed Oct. 1, 1996 to McCormack et al.; U.S. patent application Ser. No. 08/882,712 filed Jun. 25, 1997 to McCormack et al.; U.S. Pat. No. 6,111,163 to McCormack et al.; U.S. Pat. No. 6,045,900 to Haffner et al.; U.S. patent application Ser. No. 08/843,147 filed Apr. 25, 1997 to Gwaltney et al; and U.S. patent application Ser. No. 09/122,326 filed Jul. 24, 1998 to Shawver et al; U.S. Pat. No. 4,777,073 to Sheth; and U.S. Pat. No. 4,867,881 to Kinzer; the entire contents of the aforesaid references are incorporated herein by reference.

The second segments can be non-breathable or breathable film segments. In addition, the second segments can be elastic or inelastic films. In one embodiment, the second segments are elastic films and may comprise one or more elastic polymers. The second segments can comprise films similar to those described above with respect to the first segments. However, the composition and/or structure of the first segment is distinct from that of the second segment and the specific composition and/or structure of the first and second segments will be selected with respect to one another to achieve the desired functional and/or aesthetic attributes of the unitary, segmented film. The particular film composition and/or structure of the respective segments can be selected with respect to various considerations such as end use, cost, durability, strength, shelf and product life expectancy, etc.

In one aspect of the invention, a segmented film can comprise a film having varied regional breathability. As an example, the first segments can include breathable films separated along a length of the film by the second segments. The second segments can comprise either breathable or non-breathable films prior to aperturing. In order to achieve a unitary film having varied regional breathability first segments can be selected to have a higher or lower WVTR relative to the second segments after aperturing. WVTRs of adjacent segments can vary in accord with the selected film composition and/or structure thereof, thereby yielding a film having adjacent segments with distinct levels of breathability. In this regard, first and second segments can have distinct WVTRs by selecting different film compositions for the respective segments. As an example, first segments can have a higher weight percent of filler than second segments. Thus, stretching of the filled film creates a segmented film having first breathable segments and second breathable segments wherein the WVTR of first segments are higher than the WVTR of second segments, at least prior to aperturing. Additionally and/or alternatively, first and second segments can comprise different types of filler materials. The WVTRs of the respective segments can thus be varied in accord with the desired application of the segmented film. High and low breathability segments can be strategically located within the unitary segmented film to achieve the desired breathability levels in selected locations.

In a further aspect, it may be desirable to have each of the segments comprise an opaque film. This may be aesthetically desirably in certain articles, such as diapers, to mask a soiled absorbent core. Opacifying fillers can be included within one or more of the segments as needed in order to create a segmented film which is uniformly opaque. However, the weight percent and/or type of filler can be varied amongst respective segments in order to selectively achieve disparate breathability levels while having substantially uniform opacity. As a specific example, the first segments may be a highly breathable microporous LLDPE film having $CaCO_3$ filler particles and second segments may be a less breathable and less porous LLDPE film having $TiO_2$ filler particles.

As a further example, the first and second segments can include different polymers in order to achieve distinct WVTR levels. In this regard, the respective segments can be either microporous or non-microporous films and/or filled or unfilled films utilizing different polymeric compositions. In one aspect, the first segments can comprise a filled polymeric film and second segments a filled polymeric film comprising a polymer different from that comprising first segments, wherein upon stretching of the unitary segmented film a higher level of breathability is imparted to first segments relative to the WVTR of the second segments. As an example, first segments can comprise a linear low density polyethylene (LLDPE) filled film and second segments can comprise an elastomeric polyethylene filled film. The resulting breathable stretched-thinned film will have first segments with a higher WVTR than second segments. The amount and/or type of filler can likewise be varied in combination with polymer composition in order to achieve the desired WVTR, opacity and/or elasticity within the respective segments.

In a further aspect, unitary films with improved body conformance can also be achieved in accord with the present invention. The segmented film can comprise first and second segments wherein one of the first or second segments is elastic and the other segments are breathable segments. As an example, first segments can comprise inelastic breathable segments whereas second segments can comprise an elastic segment. Desirably, first breathable segments comprise at least about 25% of the area of segmented film and, even more desirably, comprise between about 50% and about 95% of the area of segmented film. The elastic, second segments can comprise a breathable or a non-breathable film. As a particular example, first segments can comprise a microporous LLDPE filled film and second segments a non-porous film comprising an elastomeric polyolefin such as elastomeric polyethylene. Alternatively, second segments can comprise an elastic breathable non-porous film such as, for example, a polyurethane, polyether ester, or polyether amide film. Still further, the first segment can comprise a microporous polyolefin filled-film and the second segment can comprise a KRATON/polyolefin polymer blend.

Elastic film segments can comprise an elastomer and desirably have a hysteresis of less than 60% and more desirably a hysteresis of less than about 50% and still more desirably a hysteresis of less than about 40%. Inelastic segments can include those segments comprising a non-elastomeric polymer having a hysteresis of greater than about 60%. In a further aspect the elastic film segments can comprise a film of a thermoplastic elastomer having a retraction/extension percent greater than 25 and desirably has a retraction/extension percent greater than about 35 and still more desirably a retraction/extension percent of at least about 50. In this regard, inelastic film segments can comprise a film of a thermoplastic polymer having retraction/extension ratio less than about 25. In a further aspect, the elastic segments desirably comprise a thermoplastic elastomer film which, upon application of a biasing force, is elongatable, to a stretched or biased length which is at least about 160 percent of its relaxed unbiased length, and which, will immediately recover at least 55 percent of its elongation upon release of the elongating force. A hypothetical example would be a one (1) centimeter sample of a material which is elongatable to at least 1.60 centimeters and which, upon release of the elongating force, will recover to a length of not more than 1.27 centimeters. Many thermoplastic elastomer films exhibit greater stretch and recovery properties and many highly elastic materials can be stretched to 160 percent of their relaxed unbiased length, and immediately recover in excess of about 75% percent of its elongation upon release of the elongating force.

In a further aspect of the present invention, the individual film segments may themselves comprise either mono-layer or multi-layered films. For example, the segmented film may include first segments including a multi-layered film and second segments including a mono-layer film. The first segments may include one or more outer layers and one or more central or intermediate layers. In other embodiments multilayered film segments can include films such as, for example, those described in U.S. Pat. No. 6,075,179 to McCormack et al.; U.S. Pat. No. 6,045,900 to Haffner et al. and U.S. patent application Ser. No. 08/882,712 filed Jun. 25, 1997 to McCormack et al., the contents of the aforesaid references are incorporated herein by reference. Additionally, the first and second segments may both include multi-layered films. For example, the first segments can comprise outer layers and a core layer and the second segments may include outer layers and a core layer. The outer layers of the first and second segments may include identical, similar or different compositions. Where one or more of the segments are elastic it is desirable that outer layers extending over the elastic segments include an extensible layer. In this regard, when comprising a small percent of the overall film thickness, layers which by themselves are inelastic can still be utilized as they will not impede the stretch and recovery provided by the elastic core layer. Desirably, however, outer layers extending over elastic segments exhibit good extensibility. As an example, the core layer of the first segment may include an inelastic breathable microporous LLDPE filled film and the core layer of the second segment may include an elastic polyolefin and the outer layers of the first and second segments may include a blend of LLDPE and EMA.

In a further aspect of the invention, the segmented film may include one or more discrete elastic segments positioned between breathable segments. In one embodiment, the breathable segments include substantially inelastic segments having high levels of breathability. For example, the segmented film may include first segments and discrete second segments disposed there between. The discrete elastic segments can either be breathable or non-breathable. Desirably, the first breathable segments include at least about 25% of the area of the segmented film and, even more desirably, include between about 50% and about 95% of the area of the segmented film. In addition, discrete elastic segments may have a width (dimension in the CD of the film) of at least 0.1 cm and desirably have a width of at least about 1 cm or more. The width of the breathable segments separating the second elastic segments can vary in accord with the desired attributes of the segmented film; use of larger elastic segments and/or more closely grouped segments will improve the overall stretch and recovery attributes of the unitary segmented film. The first breathable segments and the second elastic segments may include either mono-layer or multi-layer films. For example, the first breathable segments may include a multi-layered film including outer layers and a central core layer and the second elastic segments may include a mono-layer film. In a particular embodiment, the first breathable segments may include an inelastic multilayered film such as those described in U.S. Pat. No. 6,309,736 to McCormack et al. and the second elastic segments may include an elastic polyethylene. As a further example, the first breathable segments and the second elastic segments may both include multi-layered films with the first segment comprising outer layers and an intermediate layer and the second segment comprising outer layers and an intermediate layer. Desirably, the outer layers of the first breathable segments and the second elastic segments may include a similar or identical polymer composition such as, for example, EMA, EEA, EVA or polyolefin blends thereof.

As indicated above, a wide variety of polymers are suitable for use with the present invention. Polymers of adjacent segments should be compatible in the sense that they exhibit sufficient cohesion to form a continuous, cohesive film. In this regard, utilization of polymer blends can improve cohesion of adjacent segments. For example, polyethylene and polypropylene are not, by themselves, compatible whereas polyethylene/polypropylene blends can be compatible with polyethylene and/or polypropylene segments. In a particular embodiment, a first segment can comprise LLDPE and a polypropylene impact copolymer (such as taught in U.S. Pat. No. 6,072,005 Kobylivker et al., the entire contents of which are incorporated herein by reference), and an adjacent second segment can comprise an elastic polypropylene. Further, compatibilization may likewise be achieved through addition of one or more bonding or tackifying resins within a segment. Exemplary bonding or tackifying resins are described in U.S. Pat. No. 5,695,868 to McCormack. In addition, compatibilization segments or tie segments can be used in order to utilize a wider range of polymers. Accordingly, the use of a compatibilizing segment makes it possible to achieve a continuous cohesive segmented film using discrete segments of incompatible polymers. For example, the segmented film may include first segments and second segments wherein compatibilizing segments are disposed between the first and second segments. As a particular example, the first segments may include a breathable inelastic segment comprising a microporous LLDPE film and the second segments may include elastic polypropylene. Compatibilizing segments may be disposed between the first and second segments and may include, for example, an ethylene-propylene copolymer. In a further aspect, a compatibilizing segment can itself include a bonding or tackifying resin such as an amorphous polyalphaolefins such as REXTAC from Rextac LLC and VESTOPLAST from Huels AG of Marl, Germany. Composition of the compatibilizing segment can vary in accord with the desired film attributes and the particular polymers comprising adjacent segments.

To concurrently form apertures and embossments in the segmented film, the aperturing/embossing is may be generally accomplished via feeding the segmented film through a nip defined by at least one patterned roll such as described in U.S. patent application Ser. No. 12/649,427 to Ng, et al.

The segmented film may be "pre-stretched" (prior to nipping) by rolls rotating at different speeds of rotation so that the sheet is stretched to the desired stretch ratio in the machine direction. This uniaxially stretched film may also be oriented in the cross-machine direction to form a "biaxially stretched" film. The orientation temperature profile during the "pre-stretching" operation is generally below the melting point of one or more polymers in the film, but high enough to enable the composition to be drawn or stretched. For example, the film may be stretched at a temperature from about 15° C. to about 50° C., in further embodiments from about 25° C. to about 40° C., and in even further embodiments, from about 30° C. to about 40° C. When "pre-stretched" in the manner described above, the degree of stretch during lamination may be increased, maintained, or slightly reduced (retracted) to desired degree of tension.

The raw materials for the first and second segments of the film are prepared and added to a hoppers of an extrusion apparatus for each segment. The materials are dispersively mixed in the melt and compounded using any known technique, such as batch and/or continuous compounding techniques that employ, for example, a Banbury mixer, Farrel continuous mixer, single screw extruder, twin screw extruder, etc.

Any known technique may be used to form a segmented film from the compounded materials, including blowing, casting, flat die extruding, etc. For example, the extruded film may be blown into nip rolls to form a single-layered precursor segmented film. The rolls may be kept at temperature sufficient to solidify and quench the precursor segmented film as it is formed, such as from about 20 to 60° C.

Various additional potential processing and/or finishing steps known in the art, such as passing it through a film-orientation unit or machine direction orienter ("MDO"), aperturing, embossing, slitting, treating, printing graphics, etc., may be performed without departing from the spirit and scope of the invention. For instance, the segmented film may optionally be mechanically stretched in the cross-machine and/or machine directions to enhance extensibility. In one embodiment, the segmented film may be coursed through two or more rolls that have grooves in the CD and/or MD directions. The grooved rolls may be constructed of steel or other hard material (such as a hard rubber). Such grooved satellite/anvil roll arrangements are described in U.S. Patent Application Publication Nos. 2004/0110442 to Rhim, et al. and 2006/0151914 to Gerndt, et al., which are incorporated herein in their entirety by reference thereto for all purposes.

The segmented films may, optionally, be laminated to one or more additional films and/or fabrics. For example, a segmented film described herein may be bonded to a nonwoven web. As used herein the term "nonwoven" fabric or web means a web having a structure of individual fibers or threads which are interlaid, but not in an identifiable manner as in a knitted or woven fabric. Nonwoven fabrics or webs have been formed by many processes such as for example, meltblowing processes, spunbonding processes, hydroentangling, air-laid and bonded carded web processes. As used herein the term "spunbond" refers to small diameter fibers of molecularly oriented polymeric material. Spunbond fibers are generally formed by extruding molten thermoplastic material as filaments from a plurality of fine, usually circular capillaries of a spinneret with the diameter of the extruded filaments then being rapidly reduced as by, for example, in U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartman, U.S. Pat. No. 3,542,615 to Dobo et al, U.S. Pat. No. 5,382,400 to Pike et al. and in commonly assigned U.S. patent application Ser. No. 08/756,426 now allowed filed Nov. 26, 1996 to Marmon et al. and U.S. application Ser. No. 08/565,261 now U.S. Pat. No. 5,759,926 filed Nov. 30, 1995 to Pike et al. As used herein the term "meltblown" or "meltblowing" refers to fine fibers of polymeric material which are generally formed by extruding a molten thermoplastic material through a plurality of fine, usually circular, die capillaries as molten threads or filaments into converging high velocity, usually hot, gas (e.g. air) streams which attenuate the filaments of molten thermoplastic material to reduce their diameter. Thereafter, the meltblown fibers can be carried by the high velocity gas stream and are deposited on a collecting surface to form a web of randomly dispersed meltblown fibers. Such a process is disclosed, for example, in U.S. Pat. No. 3,849,241 to Butin et al.; U.S. Pat. No. 4,526,733 to Lau; U.S. Pat. No. 5,652,048 to Haynes et al.; and U.S. Pat. No. 5,366,793 to Fitts et al. Meltblown fibers may be continuous or discontinuous, are generally less than 10 microns in average diameter, and are commonly between about 0.5 and about 7 microns in average diameter. Nonwovens may also be multilayer nonwoven laminates that include at least one layer of a nonwoven web and/or multiple nonwoven layers such as, for example, a spunbond/meltblown/spunbond (SMS) laminate. Examples of multilayer nonwoven laminates are disclosed in U.S. Pat. No. 4,041,203 to Brock et al., U.S. Pat. No. 5,178,931 to Perkins et al. and U.S. Pat. No. 5,188,885 to Timmons et al.

The particular composition of any additional layers attached to the segmented film may be selected to achieve desired attributes such as, for example, aesthetics, strength, durability, hand, etc. As examples, segmented films can be laminated to knitted fabrics, nonwoven fabrics, foams, scrims, multilayered nonwoven laminates, and so forth. As used herein, the term "scrim" means a lightweight fabric used as a backing material. Scrims are often used as the base fabric for coated or laminated products. The segmented film and other fabric(s) can be laminated together by means known to those skilled in the art such as, for example, by thermal bonding, ultrasonic bonding, adhesive bonding and the like. Thermal point bonding is an exemplary means of laminating the respective layers. As used herein "point bonding" means bonding one or more layers of fabric at a plurality of discrete bond points. For example, thermal point bonding generally involves passing one or more layers to be bonded between heated rolls such as, for example an engraved pattern roll and a smooth calender roll. The engraved roll is patterned in some way so that the entire fabric is not bonded over its entire surface, and the anvil roll is usually flat. As a result, various patterns for engraved rolls have been developed for functional as well as aesthetic reasons. One example of thermal point bonding is described in U.S. Pat. No. 3,855,046 to Hansen et al. Numerous other bonding patterns are known such as, for example, those described in U.S. Design Pat. No. 356,688 to Uitenbroek et al. and U.S. Pat. No. 5,620,779 to Levy et al.

Where one or more of the segments within the segmented film comprises an elastic segment, any additional layers laminated thereto desirably comprise an extensible material or fabric. In this regard, the additional layer or layers can comprise, as examples, extensible nonwoven materials (e.g. creped nonwovens or nonwovens comprising highly crimped fibers), meshed fabrics, loosely woven fabrics, elastic composite materials and/or other like materials. Desirably the fabric comprises one or more layers of thermoplastic fibers which are elastic, inherently extensible or which have been treated so as to be become extensible and/or elastic and which also have a cloth-like hand and drape. Examples of suitable extensible and/or elastic materials are described in U.S. Pat. No. 4,965,122 to Morman et al.; U.S. Pat. No. 5,114,781 to Morman et al.; U.S. Pat. No. 5,336,545 to Morman et al.; U.S. Pat. No. 4,720,415 to Vander Wielen et al.; U.S. Pat. No. 4,789,699 to Kieffer et al.; U.S. Pat. No. 5,332,613 to Taylor et al.; U.S. Pat. No. 5,288,791 to Collier et al.; U.S. Pat. No. 4,663,220 to Wisneski et al.; U.S. Pat. No. 5,540,976 to Shawver et al.; European Application No. 0,712,892 A1 to Djiaw et al.; U.S. Pat. No. 5,952,252 to Shawver et al.; U.S. Pat. No. 5,714,107 to Levy et al.; and U.S. Pat. No. 6,054,002 to Griesbach et al.; the contents of the aforesaid references are incorporated herein by reference. The composition of the thermoplastic polymer may be selected as desired to achieve a material having the desired physical attributes such as, for example, elasticity, hand, tensile strength, cost and so forth. Further, the outer nonwoven layer may be treated such as, for example, by embossing, hydroentangling, mechanically softening, printing, anti-static treatment or treated in some other manner in order to achieve desired aesthetics and/or functional characteristics.

The segmented films of the present invention, and laminates thereof, can be utilized in a wide variety of applications such as, for example, in personal care articles, infection control products, protective apparel, protective covers, garments and so forth. As used herein, the term "personal care product" means personal hygiene oriented items such as diapers, training pants, absorbent underpants, adult incontinence products, feminine hygiene products, and the like. As used herein, the term "infection control product" means medically oriented items such as surgical gowns and drapes, head coverings like bouffant caps, surgical caps and hoods, industrial workwear, footwear like shoe coverings, boot covers and slippers, wound dressings, bandages, sterilization wraps, lab coats, coveralls, aprons and so forth. As used herein, the term "protective apparel" means industrial related apparel or garments such as coveralls, aprons, workwear, coveralls and so forth. As used herein, the term "protective cover" means a cover for vehicles such as cars, boats, airplanes, etc., covers for articles or equipment often left outdoors (e.g. grills and lawn furniture), yard and garden equipment, floor coverings, tents and the like. As used herein, the term "garment" means any type of non-medically or non-industrial oriented apparel which may be worn. This includes coveralls, undergarments, pants, shirts, jackets, gloves, socks, and the like.

Further, it will be appreciated by those skilled in the art that the segmented films of the present invention can be advantageously utilized in numerous other applications employing breathable barrier fabrics. As used herein, the term "barrier" means a film, laminate or other fabric which is relatively impermeable to the transmission of liquids and which has a hydrohead of at least about 50 mbar. Hydrohead as used herein refers to a measure of the liquid barrier properties of a fabric measured in millibars (mbar). However, it should be noted that in many applications of barrier fabrics, it may be desirable that they have a hydrohead value greater than about 80 mbar, 150 mbar or even 200 mbar. In one embodiment, the embossed segment of the segmented film may have a higher hydrohead value than the apertured segment. Advantageously, the embossed segment may be used in an area of the product that requires good barrier properties, while the apertured segment may be used in an area of the product that requires more breathability.

As a particular example, segmented films of the present invention can be readily converted and incorporated within a breathable barrier of a diaper or incontinence garment. Although the breathability provided by microporous films and/or laminates thereof is advantageous in many articles, there exist some situations where high breathability can be undesirable. For example, in personal care articles such as diapers or incontinence garments the breathable barrier and absorbent core generally work together to retain bodily fluids discharged into the garment. However, when fluid is retained within the absorbent core significantly higher levels of water vapor begin to pass through the breathable barrier. The increased levels of water vapor passing through the outer cover can form condensate on the outer portion of the garment. The condensate is simply water but can be perceived as leakage. In addition, the condensate can create a damp uncomfortable feel to the outer portion of the garment which is unpleasant for those handling the article. Providing a breathable barrier which has a lower WVTR in such regions, while providing good breathability in the remaining regions, would provide a garment with excellent wearer comfort yet which limits the potential for outer cover dampness. In this regard, as discussed in greater detail herein below, segments having relatively high and low breathability can be strategically positioned within absorbent articles to help reduce and/or eliminate outer cover dampness. In a further aspect, the present invention provides films having stretch and recovery in the CD direction thereby providing a film and/or article incorporating the same, with excellent body conformance attributes. Moreover, excellent body conformance can be achieved without significant loss of breathability or loss of barrier properties.

Personal care articles generally include a liquid permeable topsheet, which faces the wearer, and a liquid-impermeable bottom sheet or outer cover. Disposed between the topsheet and outer cover is an absorbent core. Often the topsheet and outer cover are sealed to encase the absorbent core. The segmented films and film laminates of the present invention are particularly well suited for use as an outer cover of a personal care article. Exemplary personal care articles are described, by way of examples only, in the following references: U.S. Pat. No. 5,415,644 to Enloe et al.; U.S. Pat. No. 4,798,603 to Meyer et al.; U.S. Pat. No. 5,810,797 to Menard et al.; U.S. Pat. No. 4,641,381 to Herren et al.; U.S. Pat. No. 4,701,175 to Boland et al.; and U.S. Pat. No. 4,938,797 to Van Gompel et al.; the entire content of the aforesaid references are incorporated herein by reference. In addition, although the following detailed description is made in the context of a disposable diaper, one skilled in the art will appreciate that the concepts of the present invention would also be suitable for use in connection with other types of absorbent articles, particularly other personal care products. In addition, although the present invention is described in the context of several specific configurations, it will be appreciated that further combinations or alterations of the specific configurations discussed below may be made by one skilled in the art without departing from the spirit and scope of the present invention.

For example, a baffle for a diaper or incontinence garment may include a continuous segmented film including a first segment and second segments have an interface as described herein. The baffle can be converted from the segmented film wherein the "ears" of the diaper correspond with second regions and the central portion of the article corresponds to one or more first segments. The first segment desirably comprises a breathable film, such as for example a monolithic film or a mono-layer or multi-layered microporous film which can be elastic or inelastic. The second segments desirably comprise an elastic segment with excellent stretch and recovery properties, such as for example, film segments comprising elastic polyurethane or KRATON/polyolefin blends. In a further example, the segmented film may be converted such that the segments run across the width of the article as opposed to the length of the article. When the segments run across the width of the article, the first region may include a breathable film corresponding to the central portion of the article and the second regions may include an elastic segment corresponding with the "waist" of the article.

Segmented films and/or laminates thereof may likewise be converted into surgical gowns, protective workwear and the like. In this regard, medical apparel is often required to provide a higher degree of protection to the wearer such as, for example, preventing penetration of blood and/or blood-borne pathogens. By comprising a segmented continuous film, good stretch and body conformance can be achieved without loss of the desired barrier properties in the desired areas. For example, surgical gowns or workwear may include breathable barrier first segments having excellent WVTRs barrier properties and the second segments may include elastic apertured segments and provide the garment with additional improved stretch, body conformance attributes, and breathability where barrier is not required.

While various patents and other reference materials have been incorporated herein by reference, to the extent there is any inconsistency between incorporated material and that of the written specification, the written specification shall control. In addition, while the invention has been described in detail with respect to specific embodiments thereof, it will be apparent to those skilled in the art that various alterations, modifications and other changes may be made to the invention without departing from the spirit and scope of the present invention.

EXAMPLES

Example films having three segments were produced to demonstrate the invention. The sample films were produced from a Randcastle film die configured for making segmented films. The film die had a main center feed port and a side edge port at the die end plate was used. The side edge port was positioned 1.5 inches upstream from the die lip where the segmented film exits the film die. A feed block configured for making segmented films with entry ports for two polymers was connected to the center feed port. The feed block was positioned 10.5 inches upstream from the die lip where the segmented film exits the film die. A first polymer composition was used to create the center segment of the film. A first extruder (twin screw Leistritz, 27 mm) was used to melt the first polymer composition and feed it to one of the feed ports on the feed block. A second polymer composition was used for the edge segments. A second extruder (single screw 1.25" Killion extruder) was used to melt the second polymer composition. After exiting the second extruder, the second polymer composition was split into two flows using a "Y" block and two 8' heated polymer hoses set to the same temperature. One flow stream was fed to one of the side edge ports of the film die. The second flow stream was fed to the second feed port on the feed block. The resultant film had a center segment of the first polymer composition with two edge segments of the second polymer composition.

Various first and second polymer compositions were used to generate five films as shown in Table 1. In Table 1, "Kraton" is 68 wt. % styrene-ethylene-butylene-styrene block copolymer (KRATON® MD6937, available from Kraton Polymers), 20 wt. % tackifier (REGALREZ™ 1126, available from Eastman Chemical) and 12 wt. % polyethylene wax (EPOLENE™ C-10, available from Eastman Chemical). "PE" is 70 wt. % polyethylene (DOWLEX™ 2047G, available from The Dow Chemical Company) and 30 wt. % $CaCO_3$ concentrate (25 wt. % polyethylene (DOWLEX™ 2047G) and 75 wt. % $CaCO_3$). "PP-PE" is 70 wt. % polypropylene (PP3155 available from ExxonMobil Chemical Company) and 30 wt. % $CaCO_3$ concentrate (25 wt. % polyethylene (DOWLEX™ 2047G) and 75 wt. % $CaCO_3$). "PP" is 100 wt. % polypropylene (PP3155).

Process Conditions:

Twin screw extruder conditions: Zone1: 178 C, Zone2: 187 C, Zone 3: 187 C, Zone 4: 180 C, Zone 5: 181 C, Zone 6:187 C, Zone 7: 197 C, Zone 8; 200 C, Flange: 200 C, Hose: 410 F, screw speed: 300 rpm, melt pressure: 800 psi.

Single screw Killion Extruder conditions: Zone1: 350 F, Zone 2: 390 F, Zone 3: 420 F, Flange and Melt Pump: 420 F, Melt Pump: 25 rpm, melt pressure: 500 psi, "Y" block 420 F, hoses from "Y" block 420 F.

Die, feedblock and end plate temperature settings: 420 F.

Winder speed: 20 fpm.

Tensile testing was done on the samples produced. Tensile testing may be done on a Sintech Corp. constant rate of extension tester 2/S with a computer-based data acquisition and frame control system or equivalent with an appropriate load cell so that the peak load falls between 10 and 90 percent of the full-scale load of the load cell (Sintech Corp, of Cary, N.C.). The tests were conducted under ambient conditions. For testing the strength of a single seam, the sample size was 3 inches in the cross-machine direction by 6 inches in the machine direction with the seam in generally in the middle of the sample. The grip size was 3 inches in width. The grip separation (gage length) was 4 inches at the start of the test. For testing the strength of both edge seams in a single test, the sample size and gage length were extended such that both edge seams were between the jaws of the grips. Samples were pulled to break at a speed of 12 inches per minute. Peak load, elongation percent at peak load (as percentage of gage length), and energy at break (area under the load-elongation curve from the origin to the point of rupture) were recorded.

In general, the seams created by introducing the edge polymer through the feedblock were found to be stronger (higher peak load and energy) than the edge seams created by introducing the edge polymer through the edge port. For the film in Ex. 1, the center segment polymer composition was similar to the edge segment polymer compositions, which is believed to have contributed to the seams of that film having similar strengths. It is noted, though, that when both seams were tested at the same time, the edge seam created by feeding the edge polymer composition through the edge port was the seam to fail.

TABLE 1

| 1st (center) polymer composition//2nd (edges) polymer composition | Feedblock Seam | | | Edge Port Seam | | |
|---|---|---|---|---|---|---|
| | Peak Load (gf) | Elongation % | Energy (g-cm) | Peak Load (gf) | Elongation % | Energy (g-cm) |
| Ex. 1 PP-PE//PP | 17745 | 6.3 | 5002 | 18922 | 4.2 | 2792 |
| Ex. 2 PP-PE//Kraton | 6613 | 305 | 57245 | 1799 | 128 | 13737 |
| Ex. 3 PE//PP-PE | NA | NA | NA | NA | NA | NA |
| Ex. 4 PE//PE | NA | NA | NA | NA | NA | NA |
| Ex. 5 Kraton//PE | 6952 | 638 | 154406 | 4676 | 260 | 44078 |

| | Test done simultaneously | | | |
|---|---|---|---|---|
| | Peak Load (gf) | Elongation % | Energy (g-cm) | Comment |
| Ex. 1 PP-PE//PP | 15136 | 56.4 | 4240 | break at edge port side |
| Ex. 2 PP-PE//Kraton | 864 | 80.4 | 13763 | break at edge port side |
| Ex. 5 Kraton//PE | 3200 | 334 | 83720 | no break, but weakness appeared at the edge port side |

Of note, for Examples 3 and 4 above, the film edge port seam split during production of the film, so no tensile testing was possible.

Figure 2:
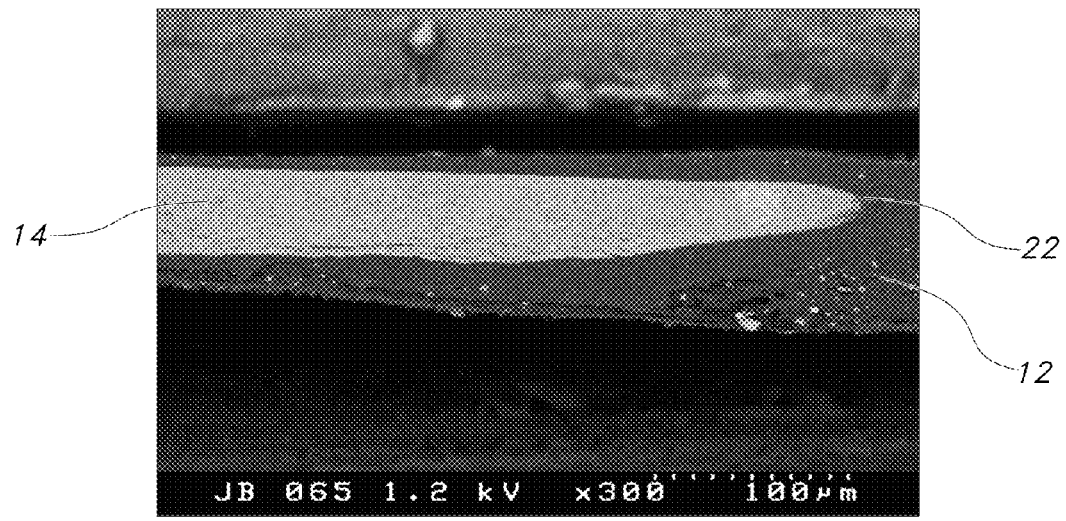
FIG. 2 is an SEM photograph of a cross-section of an exemplary segmented film.
Figure 3:
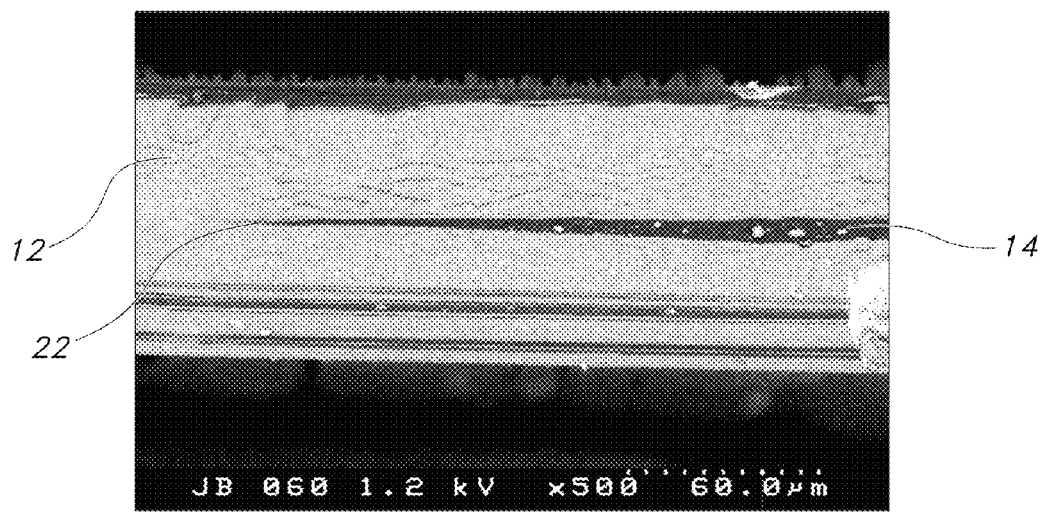
FIG. 3 is an SEM photograph of a cross-section of another exemplary segmented film.

SEM photos of the seams for Example 5 are shown in FIGS. 2 and 3. FIG. 2 is an SEM photo of the edge port seam. FIG. 3 is an SEM photo of the feedblock seam. In each photo, the second (edge) segment 14 extends past or overlaps the first (center) segment 12 to a tip 22 of the second segment. It is evident from the SEM photos that the feedblock seam extends much further than the edge port seams, as further evidenced by calculations of T/t made for the two photos. T/t for the edge port seam shown in FIG. 2 was 2.6 (50/19). T/t for the feedblock seam shown in FIG. 3 was 25 (75/3).

The thicknesses "T" and "t" are measured from SEM photographs of cross sections of segmented films showing the tip of the seam between two segments of the film. The SEM photographs, as in FIGS. 2 and 3, are prepared as follows. A sample may be cut into a lengthwise strip and marked at the cut ends. The strip is then placed in liquid nitrogen and allowed to equilibrate for at least two minutes. The sample is then bisectioned with a fresh single edged razor against a stainless steel backplate while still immersed in the liquid nitrogen. The blade is allowed to chill for around 5 to 10 seconds prior to making the cut.

The sample is then mounted on a 25 mm SEM mount (specimen stub) between small bars of aluminum such that the cut surface is horizontal. The sample is then exposed to ruthenium tetraoxide vapors for a period of 1 hour. The sample is allowed to outgas overnight and then is evaluated in the scanning electron microscope with no additional treatment or coating. The ruthenium stain reacts with cyclic unsaturation causing compounds with styrenic functionality to be aggressively stained. When an organic material is stained with a heavy metal, the backscatter coefficient increases causing the backscatter signal to increase, resulting in brighter image details. Since the secondary electron image has a backscatter component, this brightening effect from the stain is often seen in these images as well.

A Hitachi S-4500 field emission scanning electron microscope, or equivalent, may be used to evaluate the surface of the cross-section at low voltage (800-1200 volts) using both a microchannel plate (backscattered) and secondary electron detectors at magnifications of 100 to 1,000 times. Digital images may be acquired using a Quartz PCI image acquisition system, or equivalent, that is interfaced to the microscope. The Quartz PCI software, or equivalent, can also be used to make thickness and other measurements.

While the invention has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto. As used herein, the term "comprising" is inclusive or open-ended and does not exclude additional unrecited elements, compositional components, or method steps. In addition, it should be noted that any given range presented herein is intended to include any and all lesser included ranges. For example, a range of from 45-90 would also include 50-90; 45-80; 46-89 and the like.

What is claimed is:

1. A segmented film defining a machine direction and a cross-machine direction and comprising a first surface and a second surface generally parallel to the first surface, the segmented film having a first film segment having a first composition comprising a thermoplastic polymer and a second film segment having a second composition comprising a thermoplastic polymer, the first and second film segments being joined at an interface, wherein at the interface a tip of the second segment overlaps and extends into the first segment in the cross-machine direction of the film, and wherein the film has a thickness "T" at the tip of the second segment, and the second segment has a thickness "t" at a distance T in the cross-machine direction from the tip of the second segment, and wherein the ratio T/t is greater than about 3, and wherein as the distance from the interface increases in the cross-machine direction the first composition forms at least one of the first surface and the second surface on one side of the interface in the cross-machine direction and the second composition forms at least one of the first surface and the second surface on an other side of the interface in the cross-machine direction.

2. The segmented film of claim 1, wherein the interface is between the first and second film segments and extends substantially in the machine direction of the segmented film.

3. The segmented film of claim 1, wherein the ratio T/t ranges from about 3 to about 100.

4. The segmented film of claim 1, wherein the ratio T/t ranges from about 3 to about 20.

5. The segmented film of claim 1, wherein the segmented film has a substantially uniform thickness and further wherein the first and second segments extend adjacent one another continuously in the machine-direction.

6. The segmented film of claim 1 wherein the first or second film segment comprises a microporous film.

7. The segmented film of claim 6 wherein the composition of the first or second film segment comprises thermoplastic polymer and filler and further wherein the filler is distributed throughout the first or second film segment.

8. The segmented film of claim 7 wherein the first or second film segment has micropores adjacent the filler.

9. The segmented film of claim 1 wherein the first or second film segment comprises an elastic polymer selected from the group consisting of polyolefin elastomers, styrenic block copolymers, polyurethanes, polyesters, polyamides, vinyl acetates, acrylates and blends thereof.

10. The segmented film of claim 1 wherein the first or second film segment composition comprises an inelastic polyolefin polymer.

11. A personal care article comprising (i) a liquid pervious topsheet; (ii) an outer cover comprising the segmented film of claim 1; and (iii) an absorbent core positioned between the outer cover and the topsheet.

12. A multilayer laminate comprising the segmented film of claim 1 and a sheet material fixedly attached to a first surface of the segmented film.

13. The multilayer laminate of claim 12 wherein the sheet material comprises a nonwoven web.

14. A personal care article comprising (i) a liquid pervious topsheet; (ii) an outer cover comprising the multilayer laminate of claim 12; and (iii) an absorbent core positioned between the outer cover and the topsheet.

15. The multilayer laminate of claim 12 wherein the sheet material comprises an extensible fabric and wherein the first or second film segment comprises an elastomer.

* * * * *